(12) United States Patent
Signaroldi et al.

(10) Patent No.: US 8,414,224 B2
(45) Date of Patent: Apr. 9, 2013

(54) UNDERWATER PIPE-LAYING APPARATUS AND METHOD

(75) Inventors: Teresio Signaroldi, Sordio (IT);
Umberto Giovannini, Corsico (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 13/230,090

(22) Filed: Sep. 12, 2011

(65) Prior Publication Data

US 2012/0003047 A1    Jan. 5, 2012

Related U.S. Application Data

(63) Continuation of application No. 11/662,199, filed as application No. PCT/EP2005/009523 on Sep. 5, 2005, now Pat. No. 8,038,367.

(30) Foreign Application Priority Data

Sep. 10, 2004  (GB) .................................. 0420189.3

(51) Int. Cl.
*F16L 1/12*  (2006.01)
(52) U.S. Cl. ........................................ 405/158; 405/166
(58) Field of Classification Search .................. 405/158, 405/166, 169, 170; 254/245; 226/115, 147, 226/162, 165, 166, 163; 414/745.4
See application file for complete search history.

(56) References Cited

U.S. PATENT DOCUMENTS

| 3,680,322 | A | 8/1972 | Nolan, Jr. et al. |
| 6,352,388 | B1 | 3/2002 | Seguin |
| 6,551,027 | B2 | 4/2003 | Willis et al. |
| 6,688,394 | B1 | 2/2004 | Ayling |
| 6,729,803 | B1 | 5/2004 | Baylot |
| 6,733,208 | B2 | 5/2004 | Stockstill |
| 2002/0021942 | A1 | 2/2002 | Willis et al. |
| 2003/0099515 | A1 | 5/2003 | Giovannini et al. |
| 2005/0224260 | A1 | 10/2005 | Ayling |

FOREIGN PATENT DOCUMENTS

| GB | 2 214 259 A | 8/1989 |
| GB | 2 364 758 A | 2/2002 |
| GB | 2 370 335 A | 6/2002 |
| WO | WO 01/48410 A1 | 7/2001 |
| WO | WO 2004/068012 A2 | 8/2004 |
| WO | WO 2005/090844 A1 | 9/2005 |

OTHER PUBLICATIONS

International Search Report dated Nov. 25, 2005.
Written Opinion of the International Searching Authority.

*Primary Examiner* — Sean Andrish
(74) *Attorney, Agent, or Firm* — Buchanan Ingersoll & Rooney PC

(57) ABSTRACT

A pipe-laying apparatus for laying or raising a pipeline from a vessel. The apparatus includes a first pipe gripping assembly disposed on a pipe laying path along which pipeline passes during laying, a second pipe gripping assembly disposed on the pipe-laying path, and a drive unit for causing relative movement in a direction along the pipe-laying path between the first pipe gripping assembly and the second pipe gripping assembly. The first pipe gripping assembly includes both a pipe gripping arrangement for gripping a pipe during pipe-laying and a cable gripping arrangement for gripping a cable during an operation when a cable is connected to a length of pipeline.

23 Claims, 9 Drawing Sheets

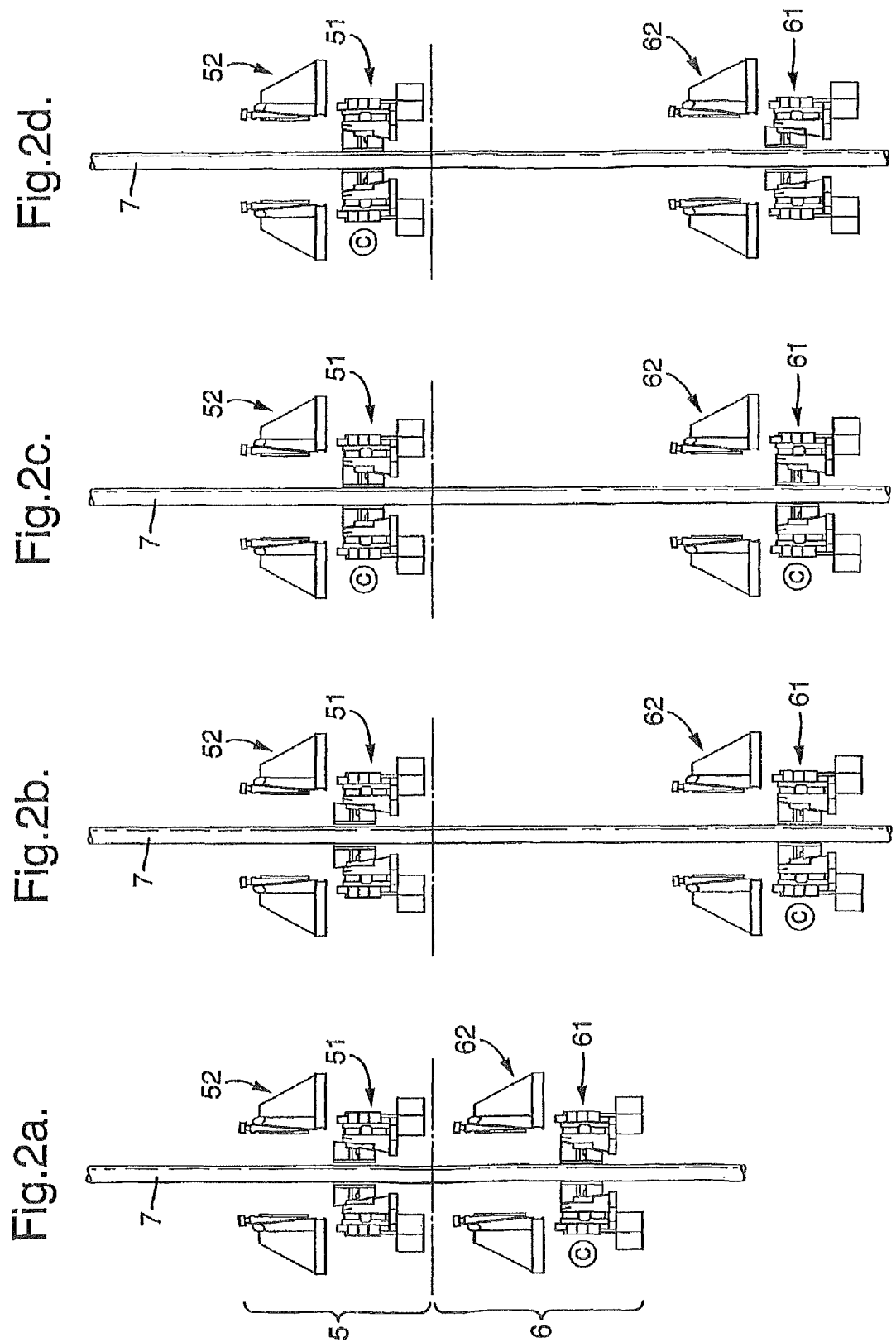

Figure 1:
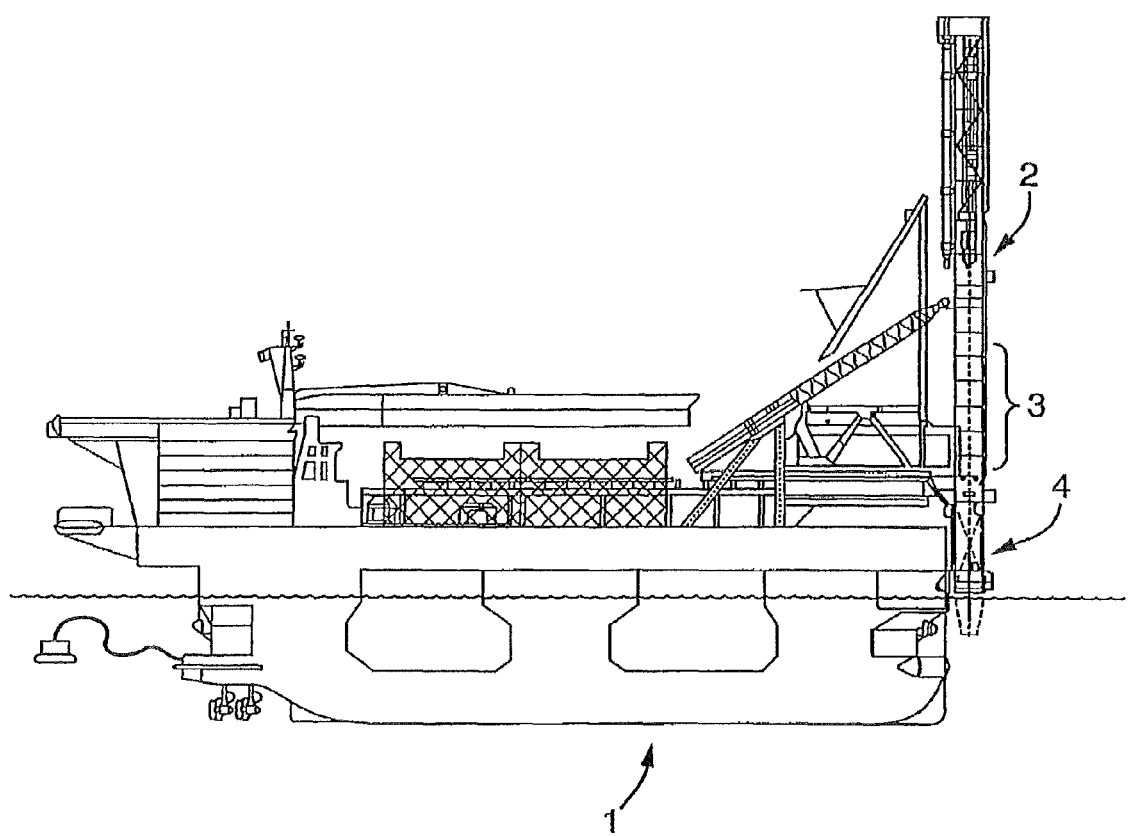

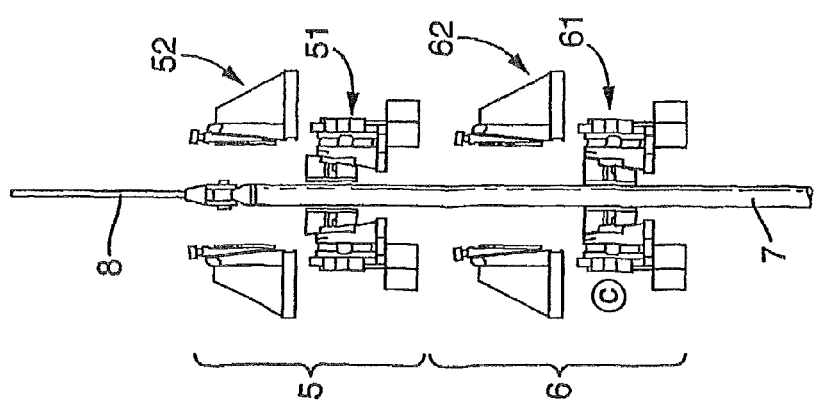
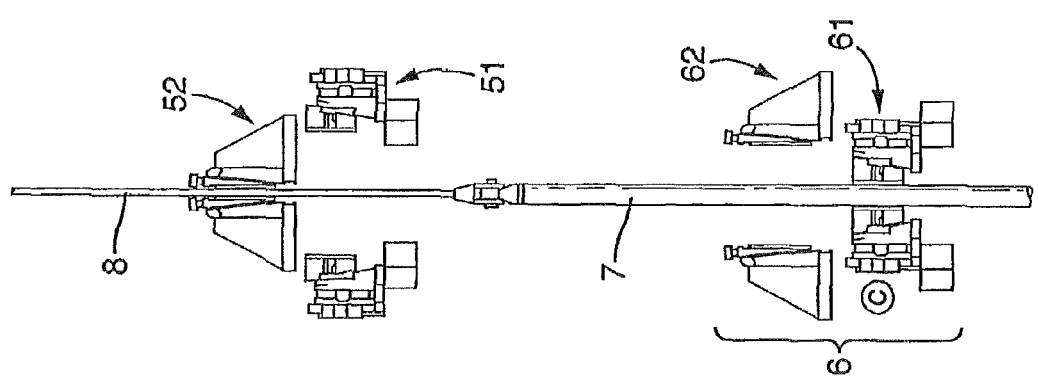
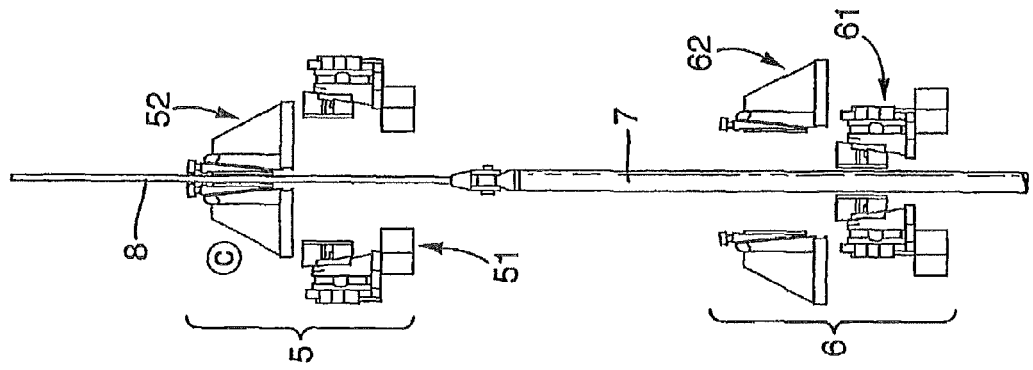

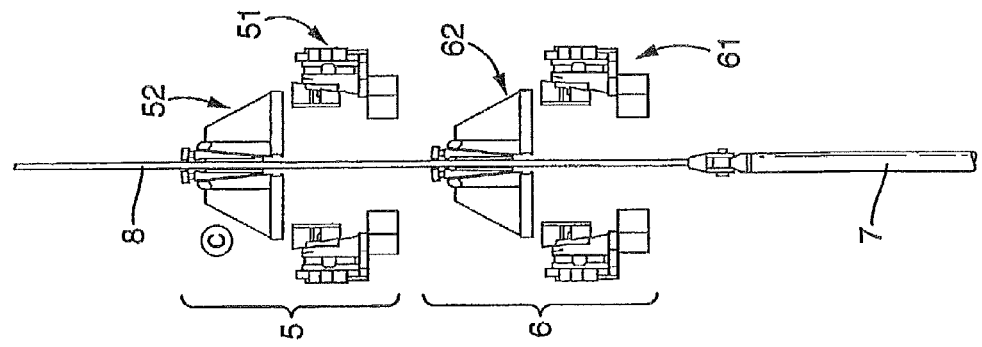
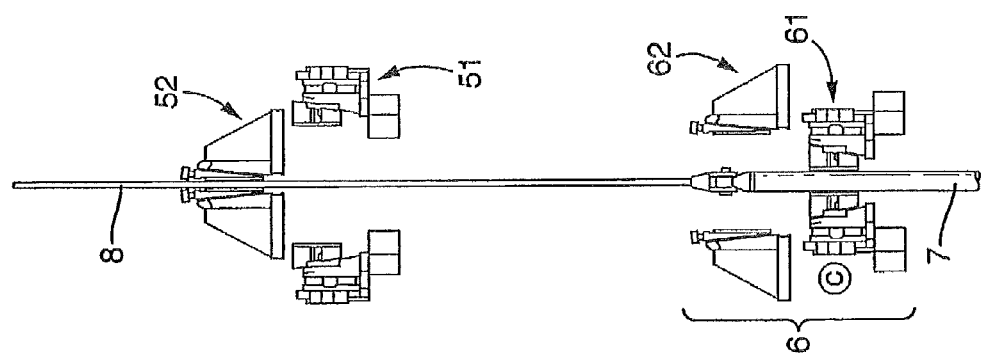
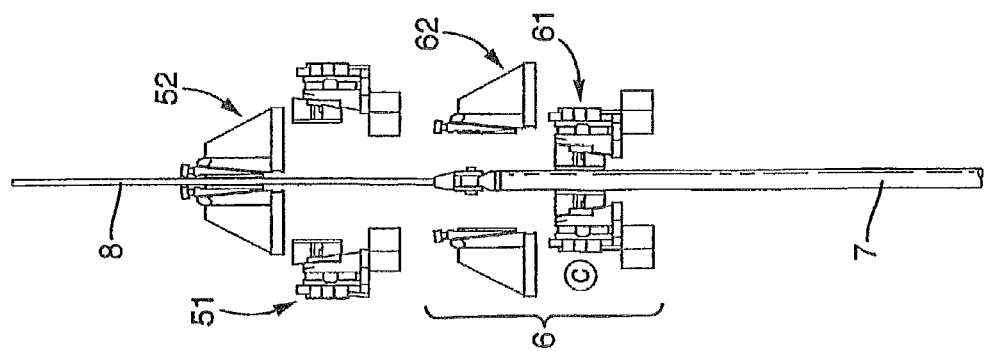

UNDERWATER PIPE-LAYING APPARATUS AND METHOD

CROSS REFERENCE TO RELATED APPLICATIONS

This application is a continuation of application Ser. No. 11/662,199, filed Apr. 11, 2007, now allowed, which is a §371 of PCT/EP2005/009523, filed Sep. 5, 2005, which in turn claims priority to Great Britain Application No. 0420189.3, filed Sep. 10, 2004, the entire content of all three of which is incorporated herein by reference.

BACKGROUND

This invention relates to a pipe-laying apparatus for laying a pipeline from a vessel, to a vessel including such an apparatus and to a method of conducting pipe-laying operations employing such an apparatus.

In shallow water "S"-laying is commonly used when laying pipeline, whilst in deeper water "J"-laying is more common. When laying pipeline by J-laying, various methods for holding the heavy weight of the pipe as it is lowered from the vessel along a tower are employed. In one known approach a combination of a travelling block and a pedestal is used whilst in another approach crawler track tensioners are used. As a further safety measure, it is also known to provide additional safety clamps for gripping the pipe in the event that the usual gripping and lowering arrangement is inadequate or inoperative. Two safety clamps may be provided, one being movable a short distance along the tower and the other being at a fixed position so that by a suitable sequence of opening and closing the clamps and moving the movable clamp the pipeline can be raised or lowered, although at a much slower rate than during normal practice. Furthermore during laying of a pipeline from a vessel it may be necessary to lower an end of the pipeline into the water to abandon the pipeline or to recover the end from below water level. In either case a cable is connected to the pipeline by means of a special head which is welded to the pipeline, and commonly a winch of some kind is employed to raise or lower the pipeline. Where reference is made to a "cable", it should be understood that the term "cable" is to be interpreted broadly and may include any form of flexible tension bearing member, including a fibre rope or a steel wire rope, for example, "full section" rope.

In either case of abandonment or recovery of the pipeline the cable from the winch has to accommodate very high tension loads. Often a double capstan winch and spooling device is used. Such an arrangement does not, however, avoid the need for a very heavy duty winch and results in long lengths of cable bearing very high tension loads, particularly when the cables run parallel to the deck, which is undesirable from a safety viewpoint. The problem is especially severe when laying a pipeline in deep water, especially when using a J-laying technique, because that results in even higher tension loads. It is then usually advantageous to have the cables extending along the tower down which pipe is laid. Providing such a winch arrangement in the tower presents significant feasibility and cost issues, because of the high loads involved, and because of the size of the winch and the need to provide adequate space and structural support in or near the tower to accommodate the winch. It is an object of the invention to provide a pipe-laying apparatus and a method of conducting pipe-laying operations that overcomes or mitigates the problems caused by using a winch for abandonment and recovery operations.

SUMMARY

According to the invention there is provided a pipe-laying apparatus for laying a pipeline from a vessel, the apparatus including a first pipe gripping assembly disposed on a pipe-laying path along which pipeline passes during laying, a second pipe gripping assembly disposed on the pipe-laying path, a drive unit for causing relative movement in a direction along the pipe-laying path between the first pipe gripping assembly and the second pipe gripping assembly, the first pipe gripping assembly including both a pipe gripping arrangement for gripping a pipe during pipe-laying and a cable gripping arrangement for gripping a cable during an operation when a cable is connected to a length of pipeline.

By providing a movable pipe gripping assembly that is capable of gripping both a pipe and a cable, it becomes possible to provide a single piece of equipment which can serve the purpose of both the safety clamps referred to above and the winch system referred to above. That enables an apparatus that is both safer and more economical to be provided.

Where reference is made to "pipe-laying" it should be understood that the term is to be interpreted broadly and may include lowering a pipeline, raising a pipeline, abandoning a pipeline and recovering a pipeline.

Whilst the invention may be applied to S-laying, it is of particular value when J-laying because of the higher loads that are experienced during J-laying. Thus the portion of the pipe-laying path along which the first and second pipe gripping assemblies are disposed is preferably upright. It will be understood by those skilled in the art that in J-laying, the pipeline may be lowered from the vessel in a substantially vertical orientation or at a significant inclination to the horizontal. Thus the term "upright" used herein should not be taken to mean vertical or even almost vertical but may include angles inclined by up to 45 degrees to the vertical.

The first and second pipe gripping assemblies may each be arranged to be movable along the pipe laying path. In that case, a second drive unit may be provided, each drive unit being able in use to cause movement of a single respective pipe gripping assembly. It is however preferred that only one of the first and second pipe gripping assemblies is movable by the drive unit in a direction along the pipe laying path. In that case, the pipe gripping assembly which is movable, may in principle, be above or below the other pipe gripping assembly but preferably it is below the other pipe gripping assembly.

As is clear from above, it is not necessary for both pipe gripping assemblies to be movable along the pipe-laying path and for simplicity it is preferred that one of the pipe gripping assemblies is at a fixed position along the pipe-laying path.

Where the pipe-laying path is upright, the pipe gripping arrangement of the first pipe gripping assembly may be provided below the cable gripping arrangement of the first pipe gripping assembly. It is in any case preferred that the pipe gripping arrangement of the first pipe gripping assembly is displaced along the pipe-laying path from the cable gripping arrangement of the first pipe gripping assembly.

Although the first pipe gripping assembly includes both a pipe gripping arrangement for gripping a pipe during pipe-laying and a cable gripping arrangement for gripping a cable during an operation when a cable is connected to a length of pipeline (for example, during an abandonment or recovery operation), the two gripping arrangements are preferably operable independently of one another. Thus it is preferred that the pipe gripping arrangement for gripping a pipe is able to be changed between a gripping condition for gripping a pipe and a releasing condition in which the pipe is free to pass through the pipe gripping arrangement, that the cable gripping arrangement for gripping a cable is able to be changed between a gripping condition for gripping a cable and a released condition in which the pipe is free to pass through the cable gripping arrangement, and that the changing of the pipe gripping arrangement between a gripping condition and a released condition is able to be effected independently of the changing of the cable gripping arrangement between a gripping condition and a released condition.

The invention may employ any of a wide variety of pipe gripping arrangements and cable gripping arrangements. For example, if a pipeline is provided with circumferential collars or other formations at sufficiently frequent intervals along the pipeline, the gripping arrangement may "grip" the pipe by engaging the side faces of those formations. In that case the pipe gripping arrangement need not press inwardly on the pipe. Usually, however, it will be preferred that the pipe gripping arrangement includes a plurality of pipe contacting elements movable radially inwardly to grip the pipe. The pipe contacting elements may rely exclusively on friction to grip but it is preferred that the elements include teeth for engaging the outer surface of the pipe. The outer surface of the pipe may be provided with a pipe coating to reduce corrosion, for example having a thickness of 2 to 3 mm, depending on the use of the pipe and other factors. The outer surface of the pipe may be provided with a further coating layer. The further coating layer may, for example, be between 1 and 3 mm thick, and comprise a plastics material, for example, polyethylene or polypropylene. The provision of a further coating layer may allow only the further coating layer to suffer permanent indentation as a result of the contacting elements. This, in turn, allows the pipe coating to reduce corrosion to remain intact, and the gripped pipe may still form part of the pipeline. It is preferred that the teeth are arranged, when they grip the pipe, to make permanent indentations only in the further pipe coating if safe and possible during use so that the corrosion-reducing pipe coating layer remains undamaged. The teeth are preferably arranged to make permanent indentations in the pipe coating, or the pipe wall, only if necessary during use, for example in a case where indenting the further coating provides insufficient grip to prevent slippage of the pipe relative to the teeth. The further pipe coating may be contiguous with the corrosion reducing layer, such an arrangement being equivalent to a pipe with an extra thick pipe coating layer. Whilst the making of such permanent indentations may not be generally desirable during normal pipe-laying operations, it is of much less significance during operations such as abandonment and recovery operations and emergency operations where the extra grip afforded by the penetration of the contacting elements into the pipe wall or pipe coating is of particular advantage. Also, the extra grip may be used in other circumstances for example to allow high loads to be spread between the pipe gripping assembly and other pipe tensioning means. The length of pipe which has been indented by the clamp teeth may be damaged by the operation of the clamp and may ultimately have to be cut off the pipeline and substituted with a new length of pipe. Alternatively or additionally a piece of pipe can be joined to the special abandonment and recovery head mentioned above.

The pipe gripping arrangement further includes an activating element movable, in use, between an activated position in which there is frictional engagement between the activating element and a pipe and a deactivated position in which the activating element does not prevent free passage of pipe through the pipe gripping arrangement.

The pipe gripping arrangement, activating element and pipe contacting elements are arranged such that when, during use the activating element is in the activated position, the pipe contacting elements are driven into greater engagement with the pipe by movement of the pipe, relative to the pipe gripping assembly, along the direction of laying. Such an arrangement allows for progressive gripping of the pipe. When the activating element is in an activated position, the pipe is at least partially supported by the frictional force between the activating element and the pipe. The load of the pipeline on the pipe is a downward load. If the load of the pipeline on the pipe is sufficient to overcome the frictional force between the activating element and the pipe, the pipe will begin to slip and, as a result of the arrangement of the pipe contacting elements, the activating elements and gripping members are forced towards the pipe and the teeth of the pipe contacting elements make indentations in the outer surface or outer coating of the pipe. If the pipe continues to slip, the gripping members continue to be forced towards the pipe and the teeth of the pipe contacting elements may engage with, and make indentations in, the pipe wall. Such a self-tightening arrangement helps to ensure a strong grip on the pipe, when necessary.

The above described pipe-gripping arrangement may have utility independently of the cable gripping arrangement.

The invention thus further provides a pipe gripping arrangement comprising a plurality of pipe contacting elements movable radially inwardly to grip a pipe. The pipe gripping arrangement may further include any of the features described herein. For example, the pipe gripping arrangement may be provided with teeth that cause, in use, indentations on the pipe, which may for example include a further pipe coating.

The cable gripping arrangement preferably includes a plurality of cable contacting elements movable radially inwardly to grip the cable. The cable contacting elements are preferably mounted in the cable gripping arrangement for limited movement in a direction inclined at an acute angle to the pipe laying path and directed inwardly along the direction of laying, whereby the cable contacting elements are driven into greater engagement with the cable by movement of the cable along the direction of laying. Such a self-tightening arrangement helps to ensure a strong grip on the cable.

Usually, because the apparatus is intended for use in special situations only, the stroke of the drive unit, which may for example comprise one or more hydraulic piston-and-cylinder arrangements, will be much smaller than the stroke of, for example, a travelling block used during normal laying. Thus the stroke of the drive unit may be less than one length of pipe. The stroke may be less than 18 m and is preferably less than 12 m.

The second pipe gripping assembly preferably includes both a pipe gripping arrangement for gripping a pipe during pipe-laying and a cable gripping arrangement for gripping a cable during an operation when a cable is connected to a length of pipeline. The second pipe gripping assembly may have any or all of the features defined above in respect of the first pipe gripping assembly. Preferably the second pipe gripping assembly is similar to, and more preferably substantially the same as, the first pipe gripping assembly.

The cable gripping arrangement of one of the first and second pipe gripping assemblies may be arranged to fit partially inside the pipe gripping arrangement of the other of the first and second pipe gripping assemblies such that the stroke length of the cable gripping arrangement is slightly longer than the stroke length of the pipe gripping arrangement.

The present invention also provides a pipe-laying vessel including a pipe-laying apparatus as defined above. The pipe-laying apparatus is preferably mounted on a tower of the vessel. The tower may be pivotally mounted to adjust the inclination of the tower to the vertical.

The present invention further provides a method of conducting pipe-laying operations employing a pipe-laying apparatus as defined above.

As will be understood from the description above, the operation may involve feeding of a pipe through the apparatus. Thus the present invention provides a method of conducting pipe-laying operations employing a pipe-laying apparatus that includes a first pipe gripping assembly disposed on a pipe-laying path along which pipeline passes during laying, and a second pipe gripping assembly disposed on the pipe-laying path, at least one of the first and second pipe gripping assemblies including both a pipe gripping arrangement for gripping a pipe during pipe-laying and a cable gripping arrangement for gripping a cable during an operation when a cable is connected to a length of pipeline, the method including the steps of [0029] gripping a pipe with the pipe gripping arrangement of the second pipe gripping assembly, gripping a pipe with the pipe gripping arrangement of the first pipe gripping assembly, releasing the grip of the second pipe gripping assembly on the pipe, effecting relative movement, in a first direction along the pipe-laying path, between the first and second pipe gripping assemblies, gripping the pipe with the pipe gripping arrangement of the second pipe gripping assembly, releasing the grip of the first pipe gripping assembly on the pipe, and effecting relative movement, in a second direction opposite to the first direction along the pipe-laying path, between the first and second pipe gripping assemblies.

The method may also include the steps of moving the second pipe gripping assembly relative to the first pipe gripping assembly along the pipe laying path from a first position to a second position whilst the grip of the second pipe gripping assembly is released, and moving the second pipe gripping assembly relative to the first pipe gripping assembly along the pipe laying path from the second position to the first position whilst the grip of the second pipe gripping assembly is gripping.

The operation may also involve feeding of a cable through the apparatus. There may for that purpose be provided a further cable gripping arrangement. Preferably both the first and second pipe gripping assemblies each include a cable gripping arrangement. The present invention provides a method of conducting pipe-laying operations employing a pipe-laying apparatus that includes a first pipe gripping assembly disposed on a pipe-laying path along which pipeline passes during laying, and a second pipe gripping assembly disposed on the pipe-laying path, the first and second pipe gripping assemblies each including both a pipe gripping arrangement for gripping a pipe during pipe-laying and a cable gripping arrangement for gripping a cable during an operation when a cable is connected to a length of pipeline, the method including the steps of gripping a cable connected to a length of pipeline with the cable gripping arrangement of the first pipe gripping assembly, releasing the grip on the cable of the cable gripping arrangement of the second pipe gripping assembly, effecting relative movement, in a first direction along the pipe-laying path, between the first and second pipe gripping assemblies, gripping the cable with the cable gripping arrangement of the second pipe gripping assembly, releasing the grip of the first pipe gripping assembly on the cable, and effecting relative movement, in a second direction opposite to the first direction, along the pipe-laying path, between the first and second pipe gripping assemblies.

As will be further understood, the apparatus of the invention is preferably able to feed the combination of a cable and a pipe through the apparatus. During lowering of a pipeline, for example during abandonment, the apparatus first lowers the pipe at the end of the pipeline and then lowers the cable connected to the end of the pipeline. Similarly during raising of a pipeline, for example during recovery, the apparatus first raises the cable connected to the end of the pipeline and then raises the pipe at the end of the pipeline.

Accordingly, the present invention provides a method of lowering a pipeline employing a pipe-laying apparatus that includes a first pipe gripping assembly disposed on a pipe-laying path along which pipeline passes during laying, and a second pipe gripping assembly disposed on the pipe-laying path, the first and second pipe gripping assemblies each including both a pipe gripping arrangement for gripping a pipe during pipe-laying and a cable gripping arrangement for gripping a cable during an operation when a cable is connected to a length of pipeline, the method including the steps of [0048] gripping a pipe to which a cable is connected with the pipe gripping arrangement of the first pipe gripping assembly, effecting relative movement, in a first direction along the pipe-laying path, between the first and second pipe gripping assemblies, gripping the pipe with the pipe gripping arrangement of the second pipe gripping assembly, releasing the grip of the first pipe gripping assembly on the pipe, effecting relative movement, in a second direction opposite to the first direction along the pipe-laying path, between the first and second pipe gripping assemblies, gripping the cable connected to the pipe with the cable gripping arrangement of the first pipe gripping assembly, releasing the grip of the second pipe gripping assembly on the pipe, effecting relative movement between the first and second pipe gripping assemblies in the first direction, gripping the cable connected to the pipe with the cable gripping arrangement of the second pipe gripping assembly, releasing the grip of the first pipe gripping assembly on the cable, and effecting relative movement between the first pipe gripping assemblies in the second direction. The aforementioned method may for example be used when laying or abandoning a pipeline. In relation to this aspect of the invention, the first and second pipe gripping assemblies are conveniently located such that on lowering the pipeline, the pipeline or cable first passes the first assembly and then the second assembly and also such that movement in the first direction, when the first pipe gripping assembly is gripping, corresponds to a lowering movement.

Also, the present invention provides a method of raising a pipeline employing a pipe-laying apparatus that includes a first pipe gripping assembly disposed on a pipe-laying path along which pipeline passes during laying, and a second pipe gripping assembly disposed on the pipe-laying path, the first and second pipe gripping assemblies each including both a pipe gripping arrangement for gripping a pipe during pipe-laying and a cable gripping arrangement for gripping a cable during an operation when a cable is connected to a length of pipeline, the method including the steps of gripping a cable to which a pipe is connected with the cable gripping arrangement of the second pipe gripping assembly, effecting relative movement, in a first direction along the pipe-laying path, between the first and second pipe gripping assemblies, gripping the cable with the cable gripping arrangement of the first pipe gripping assembly, releasing the grip of the second pipe gripping assembly on the cable, effecting relative movement, in a second direction opposite to the first direction along the pipe-laying path, between the first and second pipe gripping assemblies, gripping the pipe connected to the cable with the pipe gripping arrangement of the second pipe gripping assembly, releasing the grip of the second pipe gripping assembly on the cable, effecting relative movement between the first and second pipe gripping assemblies in the first direction, gripping the pipe connected to the cable with the pipe gripping arrangement of the first pipe gripping assembly, releasing the grip of the second pipe gripping assembly on the pipe, and effecting relative movement between the first pipe gripping assemblies in the second direction. The aforementioned method may for example be used when recovering, or otherwise raising, a pipeline. In relation to this aspect of the invention, the first and second pipe gripping assemblies are conveniently located such that on raising the pipeline, the pipeline or cable first passes the second assembly and then the first assembly and also such that movement in the second direction, when the first pipe gripping assembly is gripping, corresponds to a raising movement.

Either or both of the first and second pipe gripping assemblies may move in order to effect the relative movement.

BRIEF DESCRIPTION OF THE DRAWING FIGURES

Figure 4A:
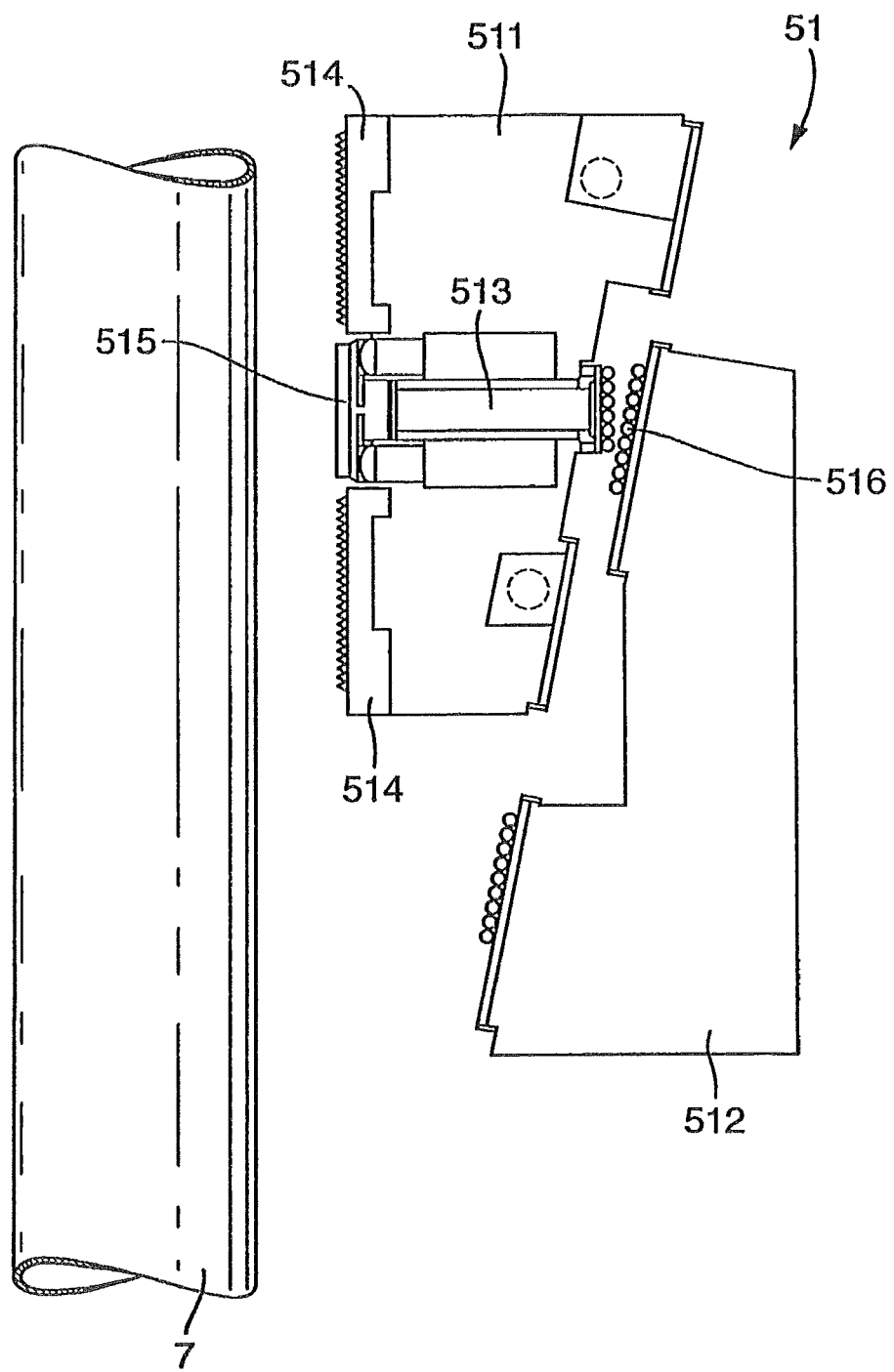
Figure 4B:
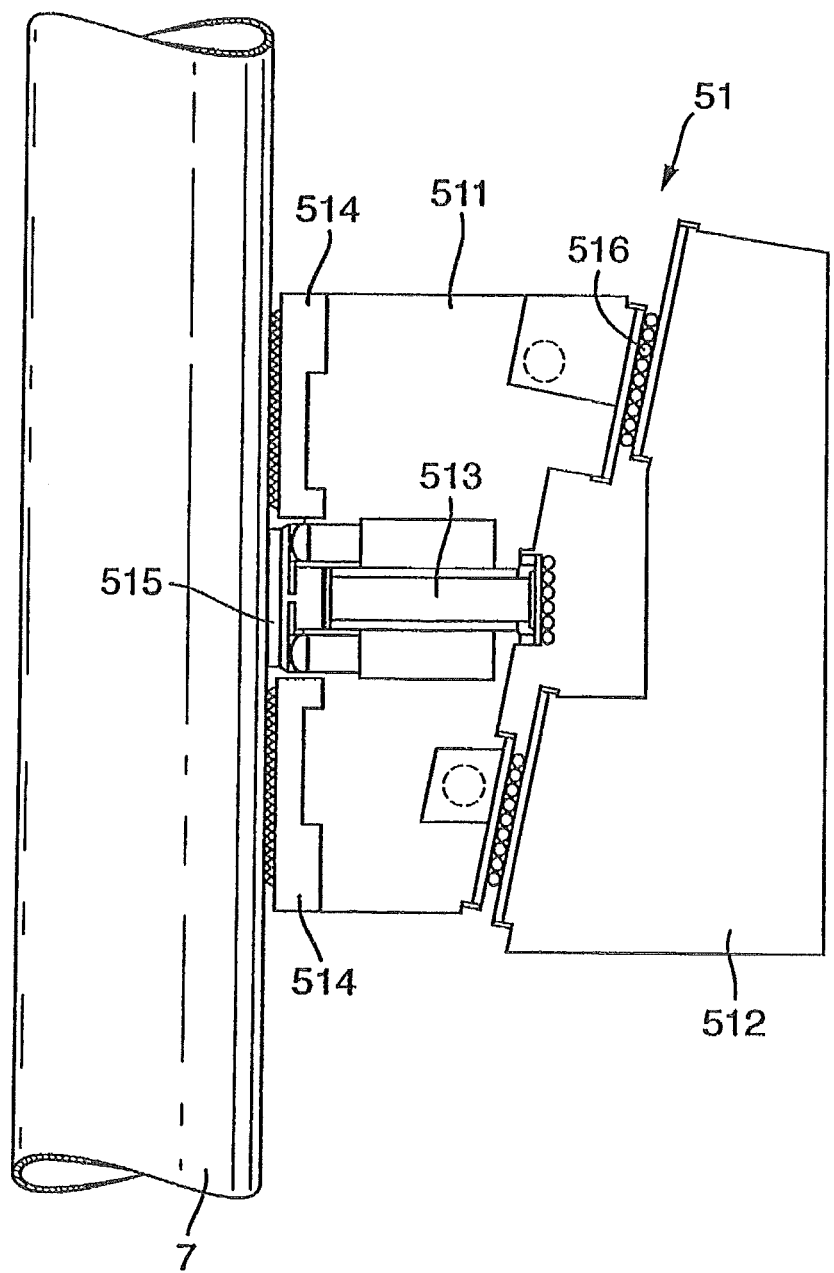
Figure 4C:
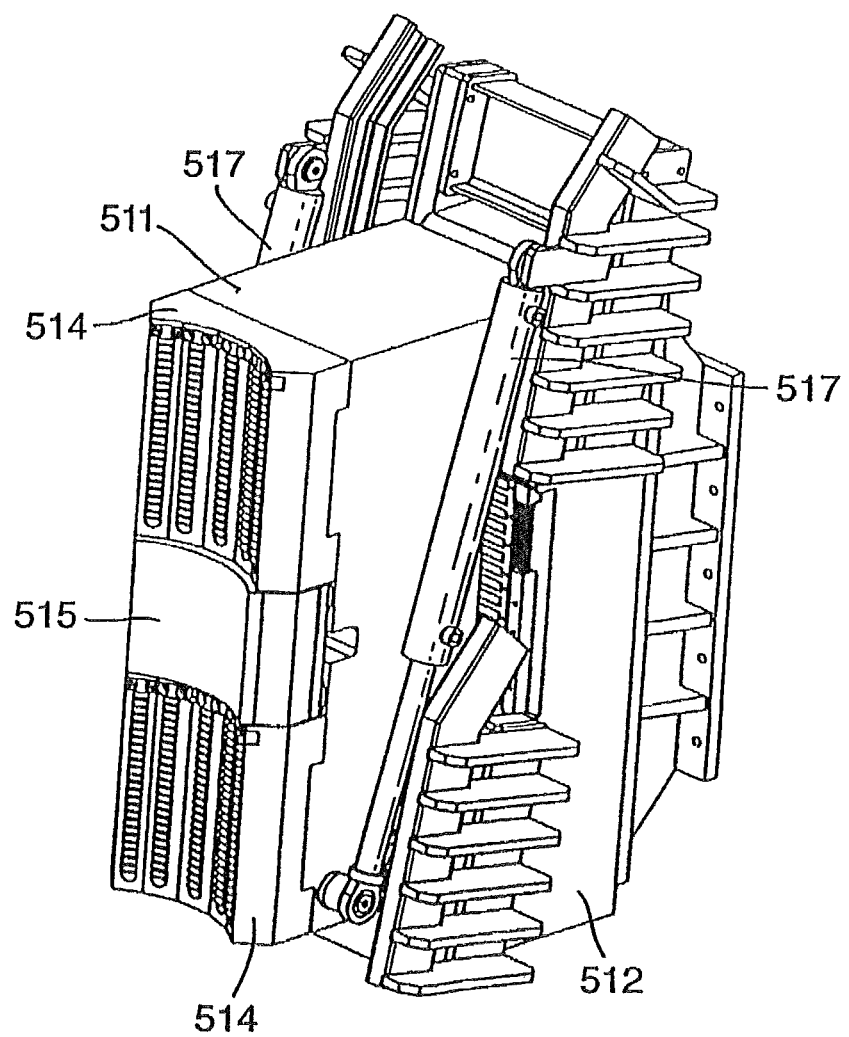
Figure 5A:
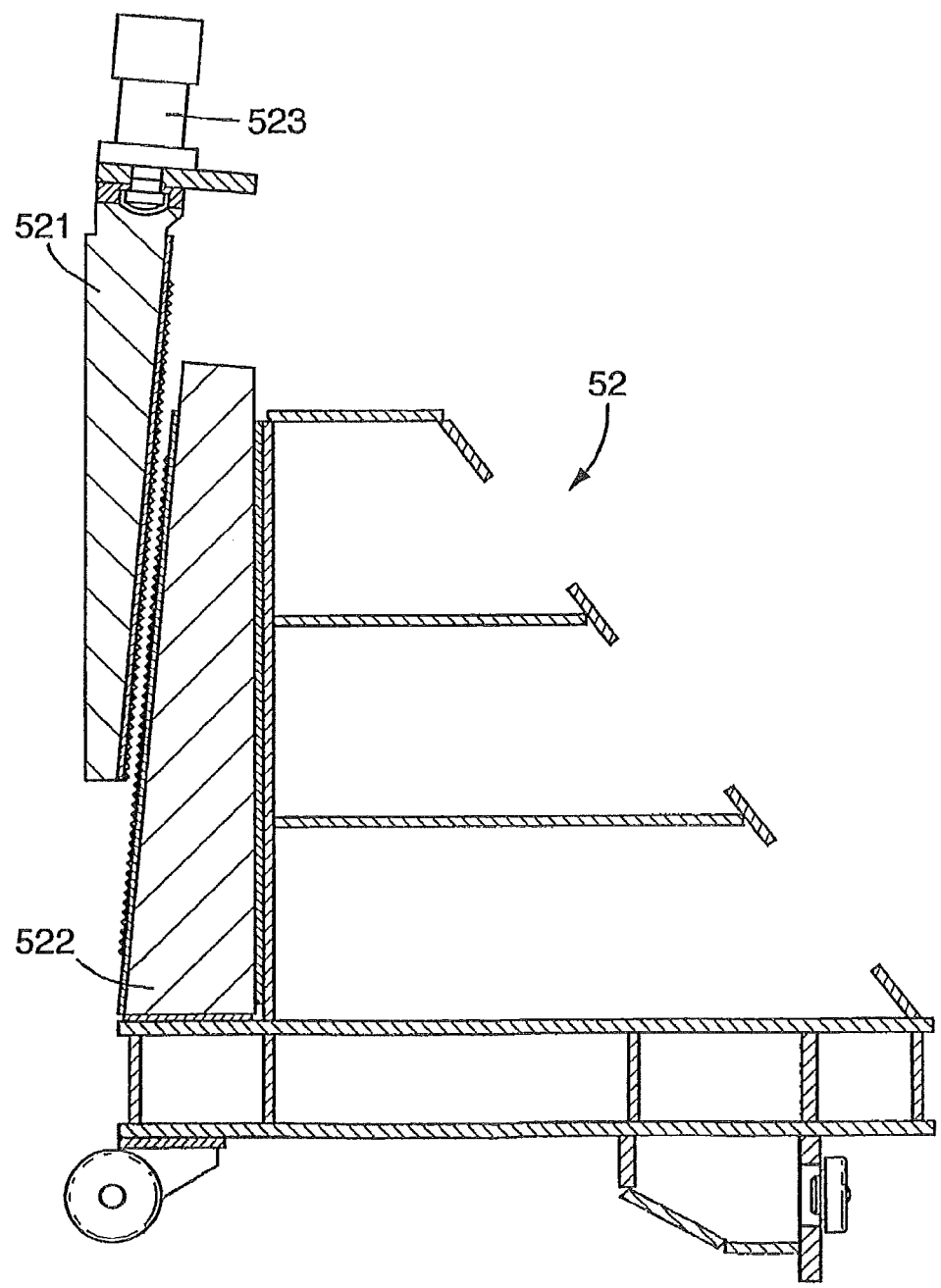
Figure 5B:
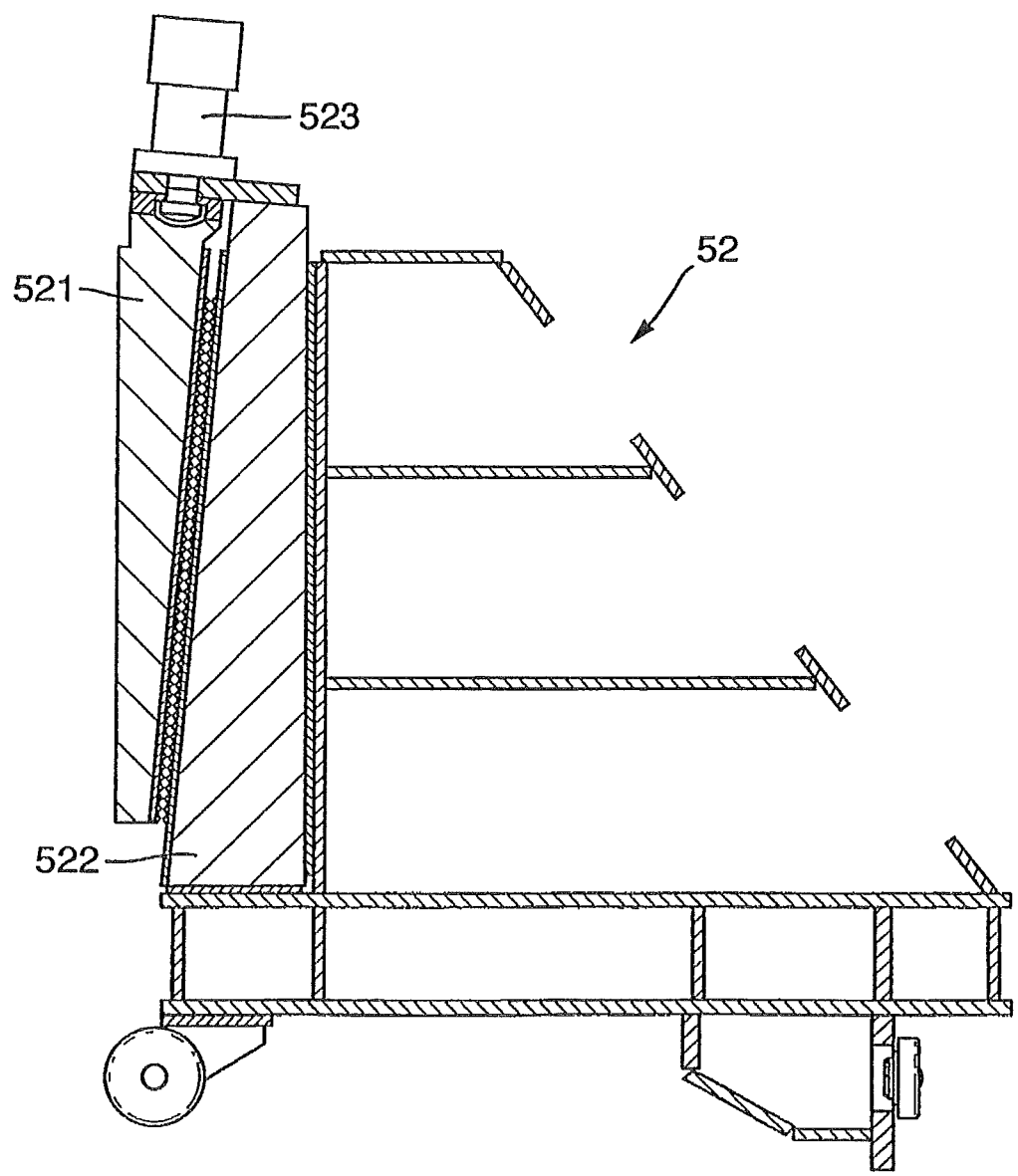

By way of example an embodiment of the invention will now be described with reference to the accompanying drawings, of which:

FIG. 1 is a side elevation view of a pipe-laying vessel which may be fitted with a pipe-laying apparatus embodying the invention, FIGS. 2a to 2d illustrate schematically the principle of operation of a pipe-laying apparatus embodying the invention and having two pipe gripping assemblies, FIGS. 3a to 3f illustrate schematically the operation of the pipe gripping assemblies, and FIGS. 4a to 4c illustrate a construction of one particular form of pipe gripping arrangement, and FIGS. 5a and 5b illustrate a construction of one particular form of cable gripping arrangement.

DETAILED DESCRIPTION OF THE PREFERRED EMBODIMENTS

The pipe-laying vessel shown in FIG. 1 simply illustrates one particular pipe-laying vessel to which the invention may be applied. The vessel, indicated generally by the reference numeral 1, is a semi-submersible vessel including a lay tower 2 pivotally mounted on the vessel. It is designed for J-laying of a pipeline. While the tower 2 is shown vertical it may be inclined at an angle of up to about 30.degree. to the vertical (with the top of the tower outboard of the vessel) when laying pipe according to the angle at which the pipe is required to leave the vessel. The vessel shown in FIG. 1 is described in more detail in WO 00/05525, the content of which is incorporated herein by reference.

As will be understood by those skilled in the art, the vessel 1 is used to lay pipeline by raising the length of pipe from the deck of the vessel into a position aligned with the tower and welding that length of pipe to the end of the pipeline which is held on the tower. The pipeline is of a considerable weight, especially if pipe laying is being carried out in deep water, and it is therefore necessary to hold up the end of the pipeline in the tower, both while the pipeline is stationary as a new section of pipe is added, and during lowering of the pipeline down the tower 2. In the particular case of the vessel shown in FIG. 1, crawler track tensioners (not shown) are provided for holding, and controllably lowering the pipeline. The tensioners are not shown in FIG. 1 but their approximate location on the tower is illustrated by reference numeral 3.

Other systems for holding, and controllably lowering, the pipeline during pipe-laying may of course be provided in place of the crawler track tensioners. For example, a travelling block and clamp arrangement may be employed. Also, while the vessel 1 is arranged to lay rigid pipeline during laying and lengths of pipe are welded to the end of the pipeline during laying, it may of course be arranged to lay flexible pipeline that is stored on a reel.

In accordance with the invention, the vessel 1 is fitted with a special pipe-laying apparatus 4 disposed on the tower 2 towards the lower end of the tower. The pipe-laying apparatus is provided in addition to the crawler track tensioners or other systems for holding and lowering the pipeline and is primarily for use in situations such as abandonment and recovery of the pipeline, as will be described further below. The principle of operation of the pipe-laying apparatus 4 will now be described with reference to FIGS. 2a to 2d.

The pipe-laying apparatus 4 comprises an upper pipe gripping assembly 5 and a lower pipe gripping assembly 6. As will be understood, the pipe gripping assemblies 5, 6 are disposed on the tower 2 of the vessel on the path along which pipeline passes during laying. In FIGS. 2a to 2d, the pipeline is designated by reference numeral 7.

The upper pipe gripping assembly 5 is at a fixed position but the lower pipe gripping assembly 6 is mounted for movement along the path of the pipeline. The dotted line in FIGS. 2a to 2d indicates a stationary reference plane. A drive unit, for example a hydraulic piston and cylinder arrangement (not shown), is provided for moving the lower pipe gripping assembly 6 towards and away from the upper pipe gripping assembly 5.

As also illustrated schematically in FIGS. 2a to 2d, each of the pipe gripping assemblies 5, 6 is movable (by means not shown) between an open position, such as that shown in FIG. 2a for the upper assembly 5 and a closed position, indicated by the letter c (in this and other Figures), such as that shown in FIG. 2a for the lower assembly 6.

FIGS. 2a to 2d show one complete cycle of operation of the pipe-laying apparatus. In FIG. 2a the lower pipe gripping assembly 6 is closed and gripping the pipe while the upper pipe gripping assembly 5 is open. The lower assembly 6 is then moved downwards under the control of the drive unit to the position shown in FIG. 2b; during this operation the pipeline 7 is lowered in a controlled manner. The upper pipe gripping assembly 5 is then closed and the lower pipe gripping assembly 6 is subsequently opened as shown FIG. 2d. The lower pipe gripping assembly 6 is then moved upwards by the drive unit back towards its original position as shown in FIG. 2a; during this movement the assembly 6 remains open and the pipeline 7 remains stationary, held by the upper gripping assembly 5. When the lower pipe gripping assembly 6 has returned to its original position it is closed, as shown in FIG. 2a and the upper pipe gripping assembly 5 is subsequently opened returning the arrangement to the same position as shown in FIG. 2a, ready for the next cycle of operations. Thus, in each cycle of operations the pipeline 7 is lowered by a distance corresponding to the length of the stroke of the movement of the lower gripping assembly 6.

Whilst the effect of the cycle of operations shown in FIGS. 2a to 2d is to lower the pipeline it will readily be seen that by altering the sequence of operations, the pipeline 7 may be raised rather than lowered.

The cycle of operations just described with reference to FIGS. 2a to 2d is already known per se in the context of pipe laying where a pair of safety clamps is used to raise or lower a pipeline during special operations.

FIGS. 3a to 3f illustrate the special construction and operation of the pipe-laying apparatus embodying the invention. Referring first to FIG. 3a, the upper pipe gripping assembly 5 is shown as including both a pipe gripping arrangement 51 and a cable gripping arrangement 52. Similarly the lower pipe gripping assembly 6 is shown as including both a pipe gripping arrangement 61 and a cable gripping arrangement 62. This enables the apparatus not only to be used to raise or lower a pipeline 7, but also to raise or lower a cable 8 which is shown connected to the end of the pipeline 7 in FIGS. 3a to 3c. Such a cable connection would be employed for example during abandonment or recovery operations.

In FIG. 3a the pipeline 7 is shown passing through the apparatus and it can be seen how by operating the upper and lower pipe gripping arrangements 51, 61, the pipe can be lowered in the manner already described with reference to FIGS. 2a to 2d. FIG. 3a shows the situation where the end of the pipeline is connected to a cable and the pipeline 7 has almost passed through the upper gripping assembly 5. At this stage the cable gripping arrangements 52, 62 are inoperative. As the pipeline 7 is lowered further, however, to the position shown in FIG. 3b, the upper cable gripping arrangement 52 is brought into operation in place of the pipe gripping assembly 51 since it is now necessary for the upper pipe gripping assembly 5 to grip cable, not pipe. Thus, as will be understood from the description above with reference to FIGS. 2a to 2d, the lower pipe gripping arrangement 61 is closed, the upper cable gripping arrangement 52 is open and the pipeline 7 is lowered. The upper cable gripping arrangement 52 is then closed, and the lower pipe gripping arrangement 61 is opened, as shown in FIG. 3c. The lower pipe gripping assembly 6 is then moved upwards by the drive unit back towards its original position. During this movement the lower pipe gripping arrangement 61 remains open and the pipeline 7 and cable 8 remain stationary, held by the cable gripping arrangement 52 of the upper gripping assembly. The lower pipe gripping arrangement 61 is then closed and the upper cable gripping arrangement 52 is opened, as shown in FIG. 3d.

The pipeline 7 is lowered further by the lower pipe gripping assembly 6, to the position shown in FIG. 3e. As before, the upper cable gripping arrangement 52 is then closed, the lower pipe gripping arrangement 61 is opened and the lower pipe gripping assembly 6 is moved upwards by the drive unit back towards its original position. During this movement, the lower pipe gripping assembly 6 remains open and the pipeline 7 and cable 8 remain stationary, held by the cable gripping arrangement 52 of the upper gripping assembly 5. FIG. 3f shows the situation where it is necessary to use the cable gripping arrangement 62 of the lower pipe gripping assembly 6. The lower cable griping arrangement 62 is then closed.

Following closure of the lower cable gripping arrangement 62, the upper cable gripping arrangement 52 is opened. The cable can then be further lowered (or raised) by operating the cable gripping arrangement 52, 62 of the gripping assemblies and reciprocating the upper gripping assembly as previously described with reference to FIGS. 2a to 2d.

Thus it may be seen how in accordance with the invention the pipe gripping assemblies 5, 6 can be employed to raise or lower either the pipeline 7 or a cable 8 of much smaller diameter connected to the pipeline 7 and furthermore they are able to operate effectively even at the junction of the pipeline 7 and the cable 8.

FIGS. 4a and 4b illustrate one particular construction of pipe gripping arrangement that may be employed in the invention.

The pipe gripping arrangement 51 comprises generally wedge shaped pipe contacting elements 511 which can be moved by hydraulic piston assemblies (not shown) between an open position, as shown in FIG. 4a and a closed, pipe gripping position, (as shown in FIG. 4b), along guide members 512.

Each pipe contacting element 511 comprises an activating element 513 and gripping members 514. The gripping members 514 include teeth for engaging the outer surface of the pipe.

The activating element 513 has a friction pad 515 at one end for contacting the outer surface of the pipe and roller bearings 516 at its other end for contacting an opposing surface of the guide member 512. The activating element 513 can by hydraulic means (not shown) be extended into contact at one end with the outer surface of the pipe and at the other end with the guide member, thereby causing frictional engagement between the pipe 7 and the friction pad 515.

While the pipe gripping arrangement 51 is not in use, it remains spaced from the pipe as shown in FIG. 4a. The dimensions of the pipe gripping arrangement are chosen to match the diameter of the pipe being laid. The pipe being laid may range from between 4 and 32 inches in diameter.

When the pipe gripping arrangement 51 is required to grip the pipe, the pipe contacting elements 511 are moved from the open position by the hydraulic piston assemblies 517 (not shown) in FIG. 4a or FIG. 4b downwardly and radially inwardly towards the pipe along the guide members 512.

Thus the activating elements 513 and gripping members 514 may be driven to a position adjacent to the outer surface of the pipe, or they may be driven out of a position adjacent to the outer surface of the pipe towards the open position.

When in a position adjacent to the outer surface, the activating element 513 is extended until the friction pad 515 is forced into contact with the pipe. Thus the activating elements 513 grip the pipe. The load of the pipeline on the pipe will be a downward load and therefore tends to encourage further downward movement of the pipe contacting elements 511. As a result of the generally wedge shape of the contacting elements 511 and guide members 512, the activating element 513 and gripping members 514 are forced towards the pipe and the teeth of the gripping members engage with the outer surface of the pipe. The teeth make indentations in the outer surface of the pipe and, by the penetration of the teeth into the pipe, affords extra grip to the contacting elements.

FIGS. 5a and 5b illustrate a construction of cable gripping arrangement 52.

The cable gripping arrangement 52 comprises cable contacting elements 521 which, as shown in FIGS. 5a and 5b are wedge shaped and mounted for inclined sliding movement along guide members 522, that sliding movement being driven by drive units (hydraulic piston/cylinder assemblies)

523. Thus the cable contacting elements 521 may be driven into contact with the cable to grip the cable by driving them downwardly along the guide members 522 (as shown in FIG. 5b) or they may be driven out of contact by driving them upwardly along the guide members 522 (as shown in FIG. 5a). The load of the cable on the elements 521 will be a downward load and therefore tends to encourage further downward movement of the elements 521 resulting in stronger gripping of the cable.

It will be appreciated that various modifications may be made to the above described embodiment without departing from the spirit of the invention.

The number of pipe contacting elements 511 and cable contacting elements 521 can be chosen to suit any particular application. Usually it will be preferred to have between two and eight elements equiangularly spaced around the pipe or cable.

The pipe gripping assemblies are able to be used with pipes having a diameter between 100 mm and 900 mm and cables with a diameter between 50 and 200 mm. The pipe gripping assemblies may be used in pipe laying operations wherein the load of the pipeline of the pipe gripping assemblies is between 500 and 2000 tons.

The maximum stroke of movement of the lower pipe gripping assembly 5 relative to the upper pipe gripping assembly 6 is a matter of choice. It will usually be relatively small and may be of the order of 12 m; in one particular example it is about 8 m. In one particular arrangement the cable gripping arrangement of the lower pipe gripping assembly fits partially inside the pipe gripping arrangement of the upper pipe gripping assembly such that the stroke length of the cable gripping arrangement is slightly longer than the stroke length of the pipe gripping arrangement.

By providing a pipe-laying apparatus of the kind described above, it is possible to avoid using a powerful winch for abandonment and recovery operations. That can save cost because the winch is no longer required and can also improve safety because of the absence on the vessel of long winch cables under high tension.

The pipe could be provided with an extra thick (5 mm) plastic pipe coating to allow limited indentation of the teeth of the pipe gripping members into the pipe coating layer to provide grip without prejudicing the effectiveness of the corrosion-reducing function of the pipe-coating.

The invention claimed is:

1. A pipe-laying apparatus for laying a pipeline from a vessel, the apparatus including
    a first pipe gripping assembly disposed on a pipe-laying path along which the pipeline passes during laying,
    a second pipe gripping assembly disposed on the pipe-laying path,
    a drive unit for causing relative movement between the first pipe gripping assembly and the second pipe gripping assembly, the relative movement in a direction along the pipe laying path,
    the first pipe gripping assembly including both a pipe gripping arrangement arranged to grip a pipe with a first diameter during pipe-laying and a cable gripping arrangement arranged to grip a cable with a second diameter, wherein the second diameter is smaller than the first diameter, during an operation when the cable is connected to a length of pipeline,
    wherein the pipe gripping arrangement and the cable gripping arrangement are operable independently of each other.

2. The apparatus according to claim 1, in which the portion of the pipe-laying path along which the first and second pipe gripping assemblies are disposed is upright.

3. The apparatus according to claim 2, in which the first pipe gripping assembly is mounted for movement along the pipe-laying path.

4. The apparatus according to claim 3, in which the second pipe gripping assembly is at a fixed position along the pipe-laying path.

5. The apparatus according to claim 3, in which the second pipe gripping assembly is mounted for movement along the pipe-laying path.

6. The apparatus according to claim 2, in which the pipe gripping arrangement of the first pipe gripping assembly is provided below the cable gripping arrangement of the first pipe gripping assembly.

7. The apparatus according to claim 1, in which the pipe gripping arrangement of the first pipe gripping assembly is displaced along the pipe-laying path from the cable gripping arrangement of the first pipe gripping assembly.

8. The apparatus according to claim 1, in which
    the pipe gripping arrangement for gripping the pipe is able to be changed between a gripping condition for gripping the pipe and a releasing condition in which the pipe is free to pass through the pipe gripping arrangement,
    the cable gripping arrangement for gripping the cable is able to be changed between a gripping condition for gripping the cable and a released condition in which the pipe is free to pass through the cable gripping arrangement, and
    the changing of the pipe gripping arrangement between the gripping condition and the released condition is able to be effected independently of the changing of the cable gripping arrangement between the gripping condition and the released condition.

9. The apparatus according to claim 1, in which the pipe gripping arrangement includes a plurality of pipe contacting elements movable radially inwardly to grip the pipe.

10. The apparatus according to claim 9, in which the pipe gripping arrangement further includes an activating element movable in use, between an activated position in which there is frictional engagement between the activating element and the pipe and a deactivated position in which the activating element does not prevent free passage of the pipe through the pipe gripping arrangement.

11. The apparatus according to claim 10, in which the pipe gripping arrangement, activating element and pipe contacting elements are arranged such that when, during use the activating element is in the activated position, the pipe contacting elements are driven into greater engagement with the pipe by movement of the pipe, relative to the pipe gripping assembly, along the direction of laying.

12. The apparatus according to claim 1, in which the pipe contacting elements include teeth for engaging an outside of the pipe.

13. The apparatus according to claim 12, configured for use with a pipe provided with a corrosion reducing coating layer and a further pipe coating layer, such that the teeth of the pipe contacting elements are able to engage with the further pipe coating layer without prejudicing the corrosion resistance of the corrosion reducing coating layer.

14. The apparatus according to claim 12, in which the teeth are arranged to be able to make permanent indentations in the pipe when the teeth grip the pipe.

15. The apparatus according to claim 1, in which the cable gripping arrangement includes a plurality of cable contacting elements movable radially inwardly to grip the cable.

16. The apparatus according to claim 15, in which the cable contacting elements are mounted in the cable gripping arrangement for limited movement in a direction inclined at an acute angle to the pipe laying path and directed inwardly along the direction of laying, whereby the cable contacting elements are driven into greater engagement with the cable by movement of the cable along the direction of laying.

17. The apparatus according to claim 1, in which the drive unit has a stroke of less than one length of pipe.

18. The apparatus according to claim 1, in which the drive unit has a stroke of less than 12 m.

19. The apparatus according to claim 1, in which the second pipe gripping assembly includes both the pipe gripping arrangement for gripping a pipe during pipe-laying and the cable gripping arrangement for gripping a cable during an operation when the cable is connected to a length of pipeline.

20. The apparatus according to claim 19, in which the second pipe gripping assembly is provided below the cable gripping arrangement of the first pipe gripping assembly.

21. A pipe-laying vessel including a pipe-laying apparatus according to claim 1.

22. The pipe-laying vessel according to claim 21, including a tower suitable for use in J-laying of a pipeline, the pipe-laying apparatus being mounted on the tower.

23. A pipe-laying vessel including a pipe laying apparatus, the apparatus including
- a first pipe gripping assembly disposed on a pipe-laying path along which pipeline passes during laying,
- a second pipe gripping assembly disposed on the pipe-laying path,
- a drive unit for causing relative movement between the first pipe gripping assembly and second pipe gripping assembly, the relative movement in a direction along the pipe laying path,
- the first pipe gripping assembly including both a pipe gripping arrangement arranged to grip a pipe with a first diameter during pipe-laying and a cable gripping arrangement arrange to grip a cable with a second diameter, wherein the second diameter is smaller than the first diameter, during an operation when the cable is connected to a length of the pipe, wherein the pipe gripping arrangement and the cable gripping arrangement are arranged for independent and exclusive operation.

* * * * *